United States Patent [19]

Fawley et al.

[11] Patent Number: 5,632,307

[45] Date of Patent: May 27, 1997

[54] METHODS FOR USING A HIGH TENSILE STRENGTH REINFORCEMENT TO REPAIR SURFACE DEFECTS IN A PIPE

[75] Inventors: Norman C. Fawley, Long Beach; Justin Schmidt, Seal Beach, both of Calif.; Norm Block, Boston, Mass.; Paul Kelty, Belmont Shores, Calif.

[73] Assignee: Clock Spring Company, L.P., Long Beach, Calif.; by said J. Schmidt, N. Block and P. Kelty

[21] Appl. No.: 472,014

[22] Filed: Jun. 6, 1995

Related U.S. Application Data

[63] Continuation of Ser. No. 344,513, Nov. 23, 1994, abandoned, which is a continuation of Ser. No. 942,731, Sep. 9, 1992, abandoned.

[51] Int. Cl.⁶ .................................................. F16L 55/18
[52] U.S. Cl. ............................. 138/99; 138/97; 264/36
[58] Field of Search ............................ 138/97, 98, 99; 264/36; 29/402.09; 285/15

[56] References Cited

U.S. PATENT DOCUMENTS

| | | | |
|---|---|---|---|
| 2,026,133 | 12/1935 | Mapes . | |
| 2,161,036 | 6/1939 | Gremmel et al. . | |
| 2,280,501 | 4/1942 | Stephenson . | |
| 2,401,092 | 5/1946 | Miller et al. . | |
| 2,713,551 | 7/1955 | Kennedy . | |
| 2,718,583 | 9/1955 | Noland et al. . | |
| 2,795,523 | 6/1957 | Cobb et al. | 138/99 |
| 2,824,033 | 2/1958 | Donaldson . | |
| 2,857,932 | 10/1958 | Calderwood . | |
| 2,924,546 | 2/1960 | Shaw | 138/99 |
| 3,096,105 | 7/1963 | Risley . | |
| 3,184,092 | 5/1965 | George . | |
| 3,188,121 | 6/1965 | Cude et al. | 138/99 |
| 3,240,644 | 3/1966 | Wolff . | |

(List continued on next page.)

FOREIGN PATENT DOCUMENTS

| | | |
|---|---|---|
| 1169790 | 6/1984 | Canada . |
| 2028524 | 9/1991 | Canada . |
| 1441653 | 5/1966 | France . |
| 52-38630 | 3/1977 | Japan . |
| 3863077 | 3/1977 | Japan . |
| 55-39444 | 3/1980 | Japan . |
| 1013039 | 12/1965 | United Kingdom . |
| 1025319 | 4/1966 | United Kingdom . |
| 1532651 | 11/1978 | United Kingdom . |

OTHER PUBLICATIONS

Federal Register, vol. 57, No. 240, Dec. 14, 1992, pp. 59199–59200.

Federal Register, vol. 58, No. 48, Mar. 15, 1993, p. 13824.

(List continued on next page.)

*Primary Examiner*—James E. Bryant, III
*Attorney, Agent, or Firm*—Lerner, David, Littenberg, Krumholz & Mentlik

[57] ABSTRACT

In a method for reinforcing defective portions of a pipeline, the defective portions are identified by conventional techniques, soil is excavated from around the pipeline to expose the deteriorated portions, any corrosion protection material is removed and the surface of the pipeline is cleaned. Gouges, dents and corrosion pitting are filled with an uncured filler material and, while the filler material is in an uncured workable state, a plurality of convolutions of a high tensile strength material are wrapped around the defective portion of the pipeline with a layer of a curable adhesive applied between adjacent convolutions. The adhesive then cures to a strongly adhesive state and the filler material cures to a rigid state capable of transferring the fluid pressure load within the pipeline almost instantaneously to the reinforcement band. Optionally, a layer of adhesive may be applied between the pipeline surface and the first convolution of the reinforcement band, in which case the adhesive must be compatible with the filler material so that both materials are able to cure fully, and also compatible with any corrosion protection material remaining on the pipeline. The method may be employed to reinforce both straight and bent portions of a pipeline.

43 Claims, 6 Drawing Sheets

U.S. PATENT DOCUMENTS

| | | |
|---|---|---|
| 3,321,924 | 5/1967 | Liddell . |
| 3,349,807 | 10/1967 | Penman . |
| 3,358,898 | 12/1967 | Medkeff et al. . |
| 3,368,005 | 2/1968 | Buczala et al. ............................. 264/36 |
| 3,439,405 | 4/1969 | Berman et al. . |
| 3,457,963 | 7/1969 | Hardwick . |
| 3,480,499 | 11/1969 | Paul, Jr. . |
| 3,483,896 | 12/1969 | Grosh . |
| 3,486,655 | 12/1969 | Ragettli . |
| 3,502,529 | 3/1970 | Borgnolo et al. . |
| 3,531,345 | 9/1970 | Torosian ................................... 138/99 |
| 3,631,897 | 1/1972 | Fischer et al. . |
| 3,687,762 | 8/1972 | McLarty . |
| 3,698,746 | 10/1972 | Loncaric . |
| 3,757,829 | 9/1973 | Berry et al. . |
| 3,768,269 | 10/1973 | Broussard et al. . |
| 3,784,441 | 1/1974 | Kaempen . |
| 3,815,773 | 6/1974 | Duvall et al. . |
| 3,843,010 | 10/1974 | Morse et al. . |
| 3,860,039 | 1/1975 | Ells . |
| 3,860,043 | 1/1975 | Kutnyak et al. . |
| 3,870,350 | 3/1975 | Loncaric . |
| 3,873,139 | 3/1975 | McCabe . |
| 3,880,195 | 4/1975 | Goodrich et al. . |
| 3,900,048 | 8/1975 | Isham et al. . |
| 3,939,874 | 2/1976 | Gray . |
| 3,969,812 | 7/1976 | Beck . |
| 3,977,614 | 8/1976 | Hardwick . |
| 4,001,054 | 1/1977 | Makepeace . |
| 4,014,370 | 3/1977 | McNulty . |
| 4,081,303 | 3/1978 | Rogers et al. . |
| 4,106,528 | 8/1978 | Laing . |
| 4,133,351 | 1/1979 | Harrison et al. ........................... 138/99 |
| 4,144,125 | 3/1979 | Maritsch . |
| 4,148,127 | 4/1979 | Somerville . |
| 4,176,691 | 12/1979 | Jude et al. . |
| 4,180,104 | 12/1979 | Park et al. . |
| 4,181,157 | 1/1980 | DeCamp . |
| 4,195,669 | 4/1980 | Ives et al. . |
| 4,214,932 | 7/1980 | Van Auken . |
| 4,224,966 | 9/1980 | Somerville . |
| 4,289,172 | 9/1981 | Ekstrom . |
| 4,340,090 | 7/1982 | Matsushita et al. . |
| 4,357,961 | 11/1982 | Chick ........................................ 138/99 |
| 4,383,556 | 5/1983 | Evgenievich et al. . |
| 4,391,301 | 7/1983 | Pflederer . |
| 4,465,309 | 8/1984 | Nimke et al. ............................. 138/99 |
| 4,514,245 | 4/1985 | Chabrier . |
| 4,552,183 | 11/1985 | Chick ........................................ 138/99 |
| 4,589,562 | 5/1986 | Fawley . |
| 4,676,276 | 6/1987 | Fawley . |
| 4,700,752 | 10/1987 | Fawley ..................................... 138/172 |
| 4,731,982 | 3/1988 | Grant et al. ............................... 264/36 |
| 4,737,330 | 4/1988 | Rau ............................................ 264/36 |
| 4,756,337 | 7/1988 | Settineri ................................... 138/99 |

OTHER PUBLICATIONS

Internal MAPCO memorandum from Douglas Lee regarding Clock Spring Pipeline Reinforcement. Mar. 23, 1990, one page.

News Release—"Panhandle Eastern Corporation Using New Pipeline Repair Technology"—Dec. 7, 1989 (pp. 1–4).

Gibbs–Ellison video of Cuero Installation on Oct. 10, 1989, date unknown.

Letter from Norm Fawley to Lawrence Postier, May 7, 1990, one page.

"Repair/Reinforcement Technology Strengthens Pipe at Low Cost", *Grid*, Fall 1989, pp. 42–43.

"Composite–Reinforced Technology—Products for the Pipeline Industry", date unknown, but prior to Feb., 1988, pp. 1–6.

Tocci, Lisa, "Building a Better Pipe", *American Gas*, vol. 73, No. 8, Aug., 1991, cover, pp. 1–5.

"A New Family of Composite Products Stops Cracks in Line Pipe, Extends Life of Pipeline, Improves Safety", *Reinforcement Digest*, No. 46, Jan. 1989, cover, pp. 2–5.

"New Pipeline Crack–Arresting Techniques Succesfully Tested", *Grid*, Winter 1987/1988, cover, pp. 1 and 27–28.

"Instructions for Clock Spring Installation", Clock Spring Company North America, L.P., Feb., 1991, pp. 1–5.

"Pipeline Reinforcement", NCF Industries, Nov. 10, 1987, pp. 1–4.

NCF Industries' Report on Panhandle Eastern Tests, Oct. 2, 1989, pp. 1–16.

"Final Report on Observations of Tests and Recommendations of the Use of Clock Spring Devices for Repair of Corrosion in Pipelines", Vieth and Kiefner, May 22, 1992, pp. 1–32.

NCF Industries' Report on Clock Spring Pipe Reinforcement Test, Jul. 25, 1989, pp. 1–16.

METHODS FOR USING A HIGH TENSILE STRENGTH REINFORCEMENT TO REPAIR SURFACE DEFECTS IN A PIPE

This is a continuation of application Ser. No. 08/344,513 filed Nov. 23, 1994, which is a file wrapper continuation of prior application Ser. No. 07/942,731, filed Sep. 9, 1992 all abandoned.

FIELD OF THE INVENTION

The present invention relates to methods for repairing axially extending structures having an internal force directed radially outward therefrom and, more particularly, to methods for repairing and reinforcing pipe in a pipeline which carries gas and/or liquid under pressure. Still more particularly, the invention relates to methods for reinforcing a corroded or otherwise defective section of pipeline without taking the pipeline out of service, or at least minimizing the down time during repair and/or rehabilitation.

BACKGROUND OF THE INVENTION

Pipelines for carrying gas or liquid under pressure are ordinarily made of steel in order to withstand the internal pressures required to transport fluids over large distances. Despite the extensive measures taken during the manufacture and installation of the pipe forming the pipeline, corrosion of the pipe may eventually occur. Pipelines buried in the ground are subject to deterioration from electrolytic and biochemical corrosion, cyclical soil stress, cathodic disbonding, and galvanic corrosion resulting from damp soil and from making pipe attachments, such as valves, from metals which are dissimilar to the steel or other material from which the pipelines are made. Over time, these corrosion mechanisms can cause pits and crevices to form in the pipe. Further, the pipeline may be subject to mechanical damage, such as gouging and denting from the machinery used to install the pipeline or to expose, inspect and repair the pipeline after installation. These gouges and/or dents weaken the pipe and may quicken the corrosion process.

The corroded and gouged regions of a pipeline are typically detected through the use of a "smart pig" or through cathodic surveys. Dented portions of a pipeline may be detected through the use of other conventional "pigs" which determine the clearance in the pipeline as they travel therethrough. Once a defective region has been identified, the fluid pressure in the pipeline is reduced, the soil surrounding the pipeline in the corroded region is excavated, and a reinforcing member is applied to cover the deteriorated area. Normally, the pipeline is prepared for the application of the reinforcing member by removing any corrosion protection material which may have been applied to the pipeline, cleaning the surface by shot-blasting and applying a primer. In one repair technique, reinforcing members in the form of a plurality of split steel sleeves are welded or bolted to the pipeline in end to end relationship until the entire deteriorated area of the pipeline has been covered. The pressure of the fluid in the pipeline is then returned to normal and the pipeline is again buried.

Repair techniques employing split steel sleeves have suffered from several drawbacks. Firstly, these sleeves are very heavy, requiring cranes and several men to transport them to the pipeline and into the proper installation position. Further, the sleeves are often welded both longitudinally and circumferentially, a time consuming process which requires highly skilled workers. Moreover, longitudinal welds in the pipeline must first be ground down in order for the sleeves to form a gas-tight or liquid-tight seal with the pipeline, while the extreme heat of the circumferential welding process for applying the sleeves can structurally weaken the pipe.

A recently developed technique for reinforcing pipeline involves the application of a high tensile strength material to the pipeline by winding to form a plurality of convolutions around the defective region. As described in published Canadian patent application No. 2,028,524, the disclosure of which is incorporated by reference herein, the surface of a deteriorated portion of the pipeline is prepared in a conventional manner. A filler material is then applied to fill in any dents, gouges and corrosion pitting to provide the pipeline with a smooth outer surface. As instructed in the aforementioned patent application and as practiced in the field, the filler material is permitted to cure to a rigid state before the reinforcement process continues. When the filler material has cured, an adhesive is applied over the filler material and over the entire circumference of the pipeline in the region of the defect. A coiled band of a high tensile strength composite is wound around the pipeline with a layer of adhesive applied between adjacent convolutions. The pipeline can be brought to normal operating pressures once the adhesive has cured to a sufficient strength.

The installation of the high tensile strength composite in accordance with the foregoing technique does not require any special machinery or equipment and can therefore be performed relatively quickly by unskilled workers having only a moderate degree of training. However, this reinforcement method has on occasion produced inconsistent results in returning the corroded pipeline to its initial burst strength. That is, although this reinforcement method may at times return the pipeline to its initial burst strength, in at least one instance, the use of the same materials and the same steps for installing the high tensile strength composite has resulted in a test pipe which was not adequately reinforced and which therefore burst prior to reaching the nominal burst pressure of the pipe. Moreover, there is no reliable way of determining whether an adequate repair has been made. In view of these unreliable results, pipeline operators have hesitated to adopt this repair technique.

Accordingly, while different techniques for repairing and reinforcing defective regions in a pipeline have been developed and used in the prior art, there still exists a need for improvements in pipeline repair and reinforcing methods which are easily performed by unskilled workers and, in particular, which restore the burst strength of the pipeline to at least its initial design value on a consistent and reliable basis.

SUMMARY OF THE INVENTION

The present invention addresses these need by providing an improved method for repairing a pipe having a defective region in its outer surface defined by at least one cavity extending from the outer surface of the pipe toward the center of the pipe. The use of the term "pipe" herein is not intended to be limiting, but rather is merely exemplary. That is, as used herein, the term "pipe" includes storage drums, pressure tanks and canisters, and any other axially extending structure having an internal force directed radially outward therefrom. A method according to the invention includes the step of providing a filler material having a workable fluid state and a rigid cured state, and then filling the cavity to at least the outer surface of the pipe with the filler material in the fluid state. Preferably, an excess of filling material is applied to overfill the pipe cavity. While the filler material is in the fluid state, a plurality of convolutions of a high tensile strength material is wrapped about the pipe to form a coil overlying the filler material. The coil is then tightened about the pipe so that the filler material completely fills that portion of the cavity underlying the coil, whereupon the filler material is permitted to cure to the rigid state. In preferred methods, the coil has a sufficient width to entirely cover the cavity. For wider cavities, a plurality of coils may be arranged adjacent one another on the pipe so that the combined width of the coils covers the cavity.

The high tensile strength material preferably consists of a band of composite material including a multiplicity of continuous, high tensile strength filaments encapsulated in a resin matrix and extending codirectionally with one another through the resin matrix. The composites may be electrically conductive or electrically non-conductive, depending on the particular needs of the end user. The filaments are preferably nonmetallic filaments; more preferably glass fibers; and still more preferably, E-type glass fibers due to their low cost.

Preferred bands of composite material may include a plurality of elastic convolutions having a coiled configuration in a relaxed condition. These bands may be wound about the pipe by deflecting portions of the band to an uncoiled configuration and maneuvering these deflected portions of the band around the pipe, wherein these portions will move back toward the relaxed condition to tighten about the pipe.

The band of high tensile strength material may define a spiral terminating in an inner end and an outer end and having a plurality of elastic convolutions for encircling and engaging the pipe, each convolution having an inner surface and an outer surface in contact with corresponding surfaces of adjacent convolutions. The high tensile strength material may consist of a plurality of individual, continuous, high tensile strength filaments encapsulated in a cured resin matrix and extending through the clock spring spiral parallel to the direction of spiral. Preferably, the elasticity of the convolutions will bias the band into the clock spring spiral with a force greater than the weight of the band so that the band remains in its clock spring spiral when suspended by the outer end of the spiral.

The step of providing the filler material may also include the step of mixing a base material with an activator capable of reacting with the base material to cure the filler material to a rigid state having a high compressive strength. A variety of curable filler materials may be used; however, filler materials including a curable acrylate base material and a peroxide activator are particularly preferred.

In pipes having raised regions on their outer surface, such as the bead of a welded joint, the step of wrapping the high tensile strength material to form a coil about the pipe may create void spaces between the outer surface of the pipe and the coil. In such cases, it is preferred that the filler material be applied to the outer surface of the pipe adjacent these raised regions before the wrapping step so that the filler material completely fills these void spaces.

A method according to the present invention may further include the step of applying a layer of an adhesive between adjacent ones of the plurality of convolutions of the band of composite material. The adhesive may also be applied between the outer surface of the pipe and a first convolution of the coil. Preferred adhesives have an uncured fluid state and a cured adhesive state. Further, the adhesive is preferably compatible with the filler material so that the adhesive does not prevent the filler material from curing to the rigid state, and so that the filler material does not prevent the adhesive from curing to the adhesive state. Such adhesive preferably is also compatible with the protective coating on the pipeline so that the adhesive does not soften the protective coating and so that the protective coating does not prevent the adhesive from curing to the adhesive state. In this regard, adhesives including mixtures of a curable acrylate and an activator for curing the acrylate are particularly preferred.

In one variant, the method of the present invention may be employed to reinforce defective regions in pipelines having bends. In bent portions of pipelines, the wrapping step may include the step of wrapping a plurality of convolutions of the high tensile strength material about the pipe to form a plurality of coils overlying the filler material so that adjacent coils are spaced from one another along the outer radius of curvature of the pipe to thereby define unwrapped regions. Optionally, these unwrapped regions may then be filled with a workable material such as the filler material.

The methods of the present invention provide a way by which pipelines can be restored to at least their original burst strength on a consistent and reliable basis, while providing improved resistance to further structural deterioration of the pipeline caused by corrosion or external damage. Further, these methods are sufficiently simple that they can be performed in a cost efficient manner by unskilled workers, while minimizing the pipeline down time during repair and/or rehabilitation. Although the invention has been described herein with reference to the repair of pipelines, the methods herein are equally applicable to repair and/or reinforce any axially extending structure having an internal force directed radially outward therefrom.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF THE PREFERRED EMBODIMENTS

The first step in repairing and reinforcing a transmission pipeline is to determine those areas of the pipeline which may be defective as a result of, for example, corrosion, gouging or denting. Typically, corrosion and gouging are detected by performing cathodic surveys or by sending through the pipeline a so-called "smart pig" which is capable of detecting the presence and location of regions that are corroded or otherwise weakened. Similarly, a clearance "pig" may be passed through the pipeline to determine dented regions of the pipeline. Once these defective regions have been detected, the fluid pressure within the pipeline is reduced substantially below the operating pressure and the soil surrounding the pipeline is excavated to expose these defective regions. The pipeline is then prepared for the application of a reinforcement member by removing any corrosion protection and cleaning the surface of all loose material.

Figure 1A:
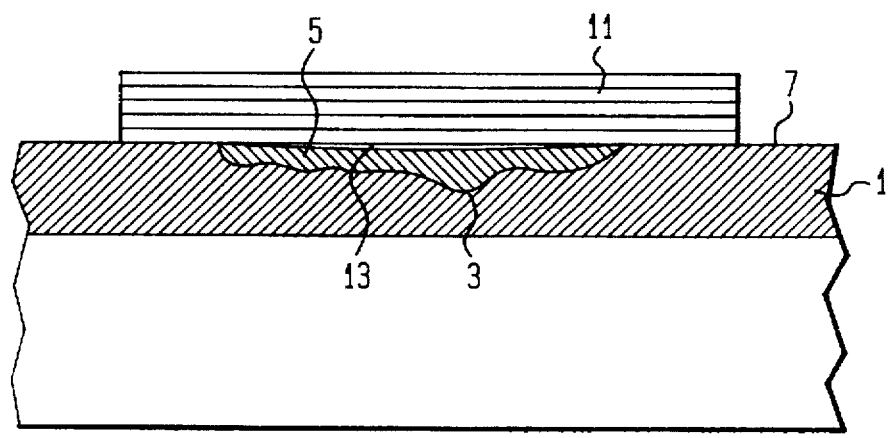
FIGS. 1A and 1B are enlarged, highly schematic, partial cross-sectional views of a pipe showing a region of deterioration repaired in accordance with a prior art method.
Figure 1B:
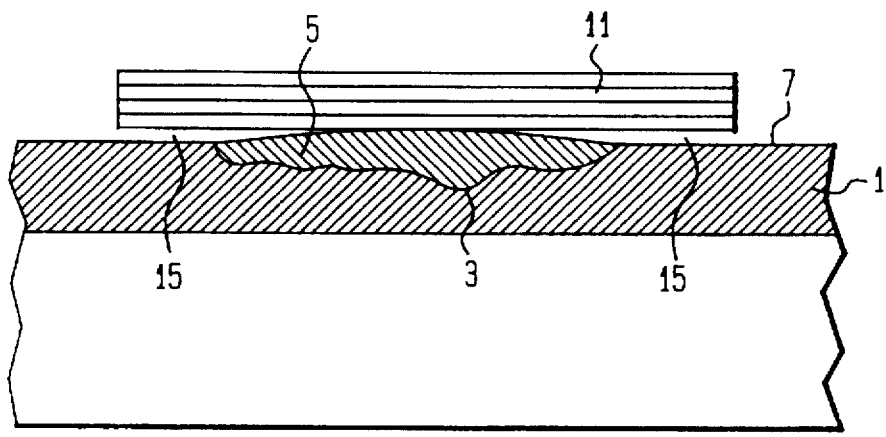
Figure 2:
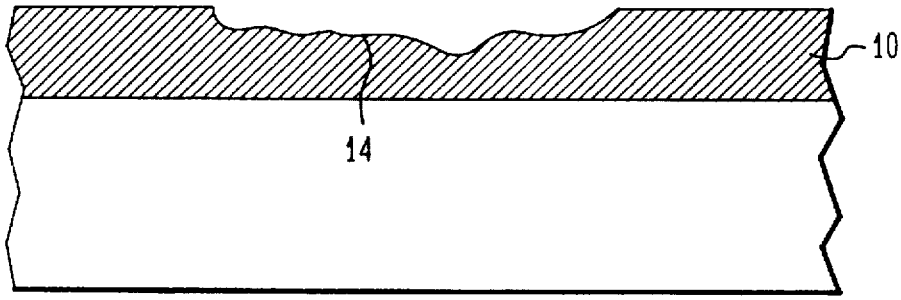
FIGS. 2–6 are enlarged, highly schematic, partial cross-sectional views of a pipe showing the steps of repairing a region of deterioration in accordance with the present invention.

In a relatively recent development, pipelines have been reinforced by wrapping a plurality of convolutions of a high tensile strength material around the defective region. Pipelines reinforced in accordance with this prior art method are shown in FIGS. 1A and 1B. In an overview of this technique, once the defective regions of the pipeline 1 have been located, exposed and cleaned, any gouges, dents or pits 3 caused by corrosion are filled with a curable filler material 5. The filler material is allowed to cure to a rigid state and is then ground or sanded until approximately flush with the outer surface 7 of the pipe. The circumference of the pipeline in the defective region, including that area containing the filler material 5, is then coated with an adhesive (not shown), and a coiled band 11 of a high tensile strength composite is wound in a plurality of convolutions around the pipeline with a layer of adhesive between adjacent convolutions.

The initial steps in reinforcing a pipeline in accordance with the present invention are essentially the same as those of the aforementioned prior art technique. That is, corroded and other weakened areas of the pipeline are detected in the conventional manner through the use of cathodic surveys or smart pigs. After the defective regions have been identified, these areas are exposed by excavating to remove the soil from around the pipeline.

Pipelines ordinarily are installed with corrosion protection, typically in the form of a coating of coal tar, tape, thin film epoxy, polyethylene, mastic, epoxy paint or polyurethane paint. Should the corrosion protection become damaged, corrosion of the pipeline will normally occur. Before a reinforcement can be applied to the pipeline, the corrosion protection must be removed. This is typically accomplished by chipping and scraping the protective coating from the pipeline. The removal of this protective coating reveals the regions of corrosion which leave the surface of the pipe in a rough, irregular condition.

In addition to defects caused by corrosion, pipelines may be mechanically damaged by the heavy machinery used during the installation process or during excavation to make repairs. Such mechanical damage is typically in the form of gouges or dents in the pipeline wall. Generally, such gouging and denting may weaken the pipe itself and the coating of corrosion protection thereabout so that, if left unrepaired, the damaged portion of the pipe may corrode at an advanced rate.

A method for reinforcing pipelines in accordance with the present invention is shown in FIGS. 2–6. Following the removal of the protective coating, the method continues by cleaning the surface of the pipeline by wire brushing, sand blasting or other conventional techniques to remove all loose material in the defective region, and the raised edges of any gouges are feathered down by grinding. Optionally, a pretreat bond primer may then be applied to the gouges, dents and areas of pitting caused by corrosion.

Figure 3:
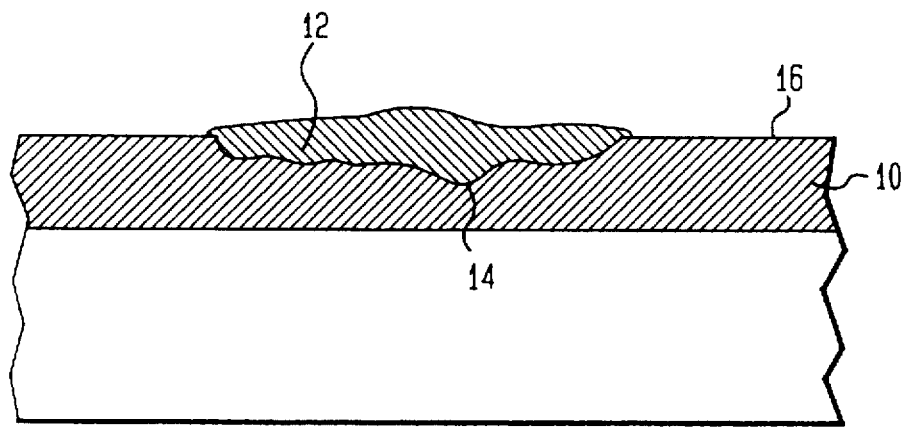

Referring particularly to FIG. 3, once the defective region of the pipe 10 has been adequately prepared, a filler material 12 is applied over the defective region to completely fill in, and in fact to overfill, any pits, gauges or dents, such as cavity 14. In this regard, a suitable filler material will initially have a pasty fluid consistency so that it can be readily applied and worked into cavity 14, and so that it will adhere to cavity 14 once applied. The filler material 12 must maintain this workable consistency for a sufficient length of time for the reinforcement process to be completed, after which it will cure or harden to a rigid state. In this rigid state, the filler material should have a sufficient compressive strength to withstand the load which will be transferred through the filler material from the pipe to the reinforcement band. Filler materials having compressive strengths of at least 9,000 psi as measured by ASTM D695 are particularly desirable.

As will be discussed more fully below, suitable filler materials will also be compatible with the adhesives used in the installation process of the present invention. As used herein, the term "compatible" refers to filler materials which will completely cure to a rigid state in contact with such adhesives, and which will not interfere with the curing of such adhesives to their full adhesive state. A particularly preferred filler material 12 in accordance with the present invention is MA441, produced by Illinois Tool Works of Chicago, Ill. This filler material is a two component system consisting of a methyl methacrylate base component filled with an essentially inert material, such as glass beads, and a peroxide activator for curing the base component.

Figure 4:
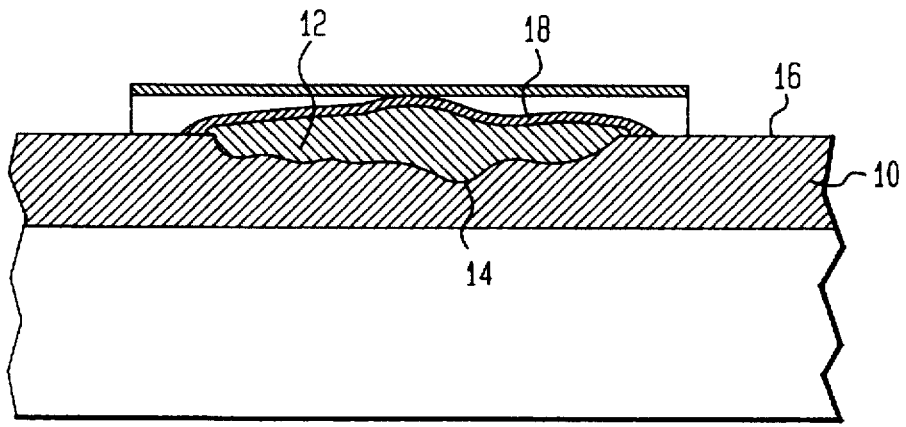

The filler material 12 is applied not only to fill cavity 14, but preferably so that it extends above the outer surface 16 of the pipe 10. While the filler material 12 is in its uncured workable state, a layer of an adhesive 18 may be applied by paint roller, brush or other conventional method to the entire outer circumference of the pipe 10 in the defective region, including that region containing filler material 12, as shown in FIG. 4. Preferred adhesives will initially be fluid in an uncured state with an appropriate viscosity for easy application and adherence to the pipeline. Moreover, preferred adhesives will be compatible with the protective coating which may remain as a film on the pipeline. In that regard, such preferred adhesives will not soften the protective coating material and will not be prevented from curing to the adhesive state by the protective coating material. The adhesive will remain in this uncured fluid state for a sufficient length of time to complete the installation process, after which it will cure to a harder, more strongly adhesive state. Particularly preferred adhesives in the cured state will provide protection against ultraviolet radiation, and will exhibit long term resistance to creep at the temperatures at which the pipeline operates, as well as resistance to water absorption and degradation from environmental exposure over long periods of time. Desirably, such adhesives will have a lap shear strength of at least about 900 psi as determined by ASTM D1002, a nominal elongation of about 30%, and a pot life of about 45 minutes in a temperature range of about 32°–110° F. before gelling begins and the adhesive is no longer workable. A particularly preferred adhesive in this regard is MA440, produced by Illinois Tool Works of Chicago, Ill. This adhesive is a two component system consisting of a methyl methacrylate base component and a peroxide catalyst. The MA440 adhesive and the MA441 filler material are compatible with one another such that neither one interferes with the curing of the other to its final cured state.

Figure 7:
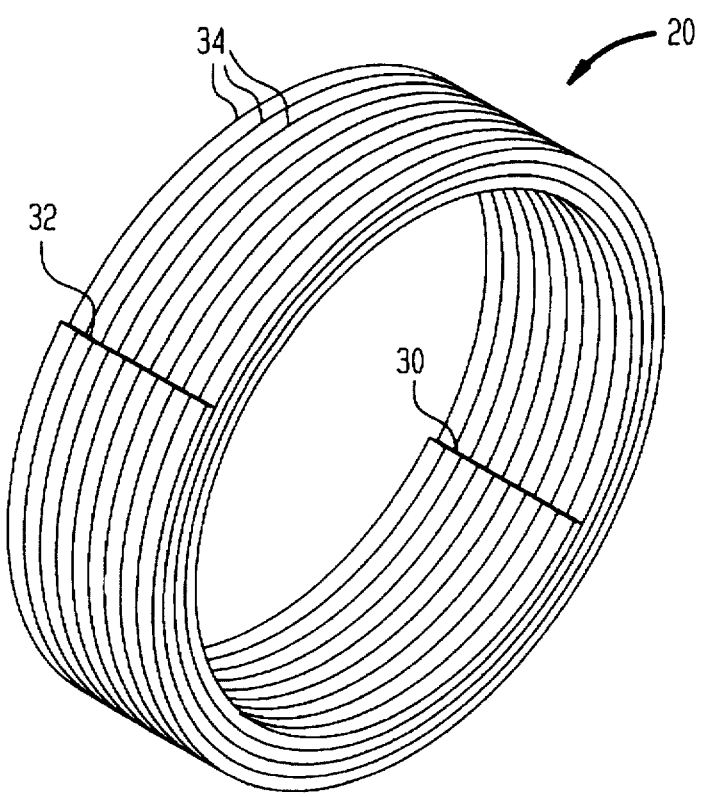
FIG. 7 is a perspective view of a reinforcement band formed from a high tensile strength material in accordance with the present invention.

While the filler material 12 is in its uncured workable state and the adhesive 18 is in its uncured fluid state, reinforcement band 20 is installed around the outer surface of pipe 10 over the defective region. As can be seen in FIG. 7, reinforcement band 20 is a web of a composite material having a rectangular cross-section, an inner surface, an outer surface, and sides or edges. The band 20 is coiled into a spiral having a plurality of concentric elastic convolutions including an innermost convolution having an inner end 30, an outermost convolution having an outer end 32, and intermediate convolutions. Methods for fabricating reinforcement band 20 are generally disclosed in U.S. Pat. No. 4,700,752 to Fawley. Preferred methods for fabricated reinforcement band 20 are disclosed in U.S. patent application Ser. No. 07/942,642, entitled "Method of Making a High Tensile Strength Composite Spiral", which application was filed simultaneously herewith, naming Messrs. Fawley, Schmidt and Tipton as inventors. The disclosures of both of these references are incorporated by reference herein. The composite material includes a large plurality of individual, lightweight, high tensile strength fibers encapsulated in a cured resin matrix and extending parallel to one another in the direction of the spiral. Although the parallel fibers are generally indicated by parallel longitudinal lines 34 in FIG. 7, each space between adjacent parallel lines 34 actually represents hundreds or thousands of longitudinal fibers, each having a diameter of less than about 0.001 inches. The fibers preferably are nonmetallic and electrically non-conductive, although the use of electrically conductive fibers, such as carbon or graphite fibers, is not prohibited. Preferred fibers in this regard are glass fibers, with E-type glass fibers being particularly preferred due to their relatively low cost. However, it is contemplated that fibers formed from other high tensile strength materials, such as S-type glass and Kevlar, may be used.

Suitable resins for forming the composite web are elastic when cured, thereby exhibiting an elastic memory. When these resins are cured in a coiled configuration, such as that of reinforcement band 20, a force can be used to uncoil the band, but once this force is removed the band will return substantially to its initial coiled configuration. The elasticity of the convolutions is preferably such that the band is biased into the coiled configuration with a force greater than the weight of the band so that the band will remain in the coiled configuration when suspended by outer end 32. Preferably, the cured resin will be resistant to degradation from moisture, the chemical activity of soil and other environmental activity so as to protect the embedded fibers and the portion of the pipe 10 underlying the reinforcement band 20 from corrosion. The resin may be electrically non-conductive or may be made electrically conductive by incorporating an electrically conductive material therein, all depending upon the needs of the end user. Suitable resin materials for forming the composite web include polyester resins, polyurethane resins and epoxy resins. Isophthalic polyester resins are particularly preferred.

There is no requirement that a layer of adhesive 18 be applied directly to the surface of pipe 10 and filler material 12 before the installation of reinforcement band 20. However, this adhesive layer may be applied as an additional protective layer to assure that moisture cannot penetrate and initiate corrosion between the pipe 10 and reinforcement band 20. Generally, the adhesive will not adhere or will not strongly adhere to the corrosion protection material originally in place on the pipe 10. Indeed, the adhesive may actually react with and soften the corrosion protection material. Therefore, where it is difficult or impossible to completely remove the layer of corrosion protection material from pipe 10 prior to reinforcement, and where the adhesive is not compatible with the corrosion protection material, a barrier film to which the adhesive will strongly adhere is applied around the protective material on pipe 10. Such barrier films may include, for example, conventional shrink wraps, Trenton wax and the like. In any event, after the pipe 10 has been properly cleaned, but before the application of adhesive 18, an adhesive pad 36, having a contact adhesive on both sides, is attached to pipe 10 adjacent cavity 14, in the circumferential portion of pipe 10 containing cavity 14. A suitable adhesive pad 36, for example, may be a rectangularly shaped close cell vinyl pad with dimensions of about 3.50 inches by about 9.25 inches.

Figure 8:
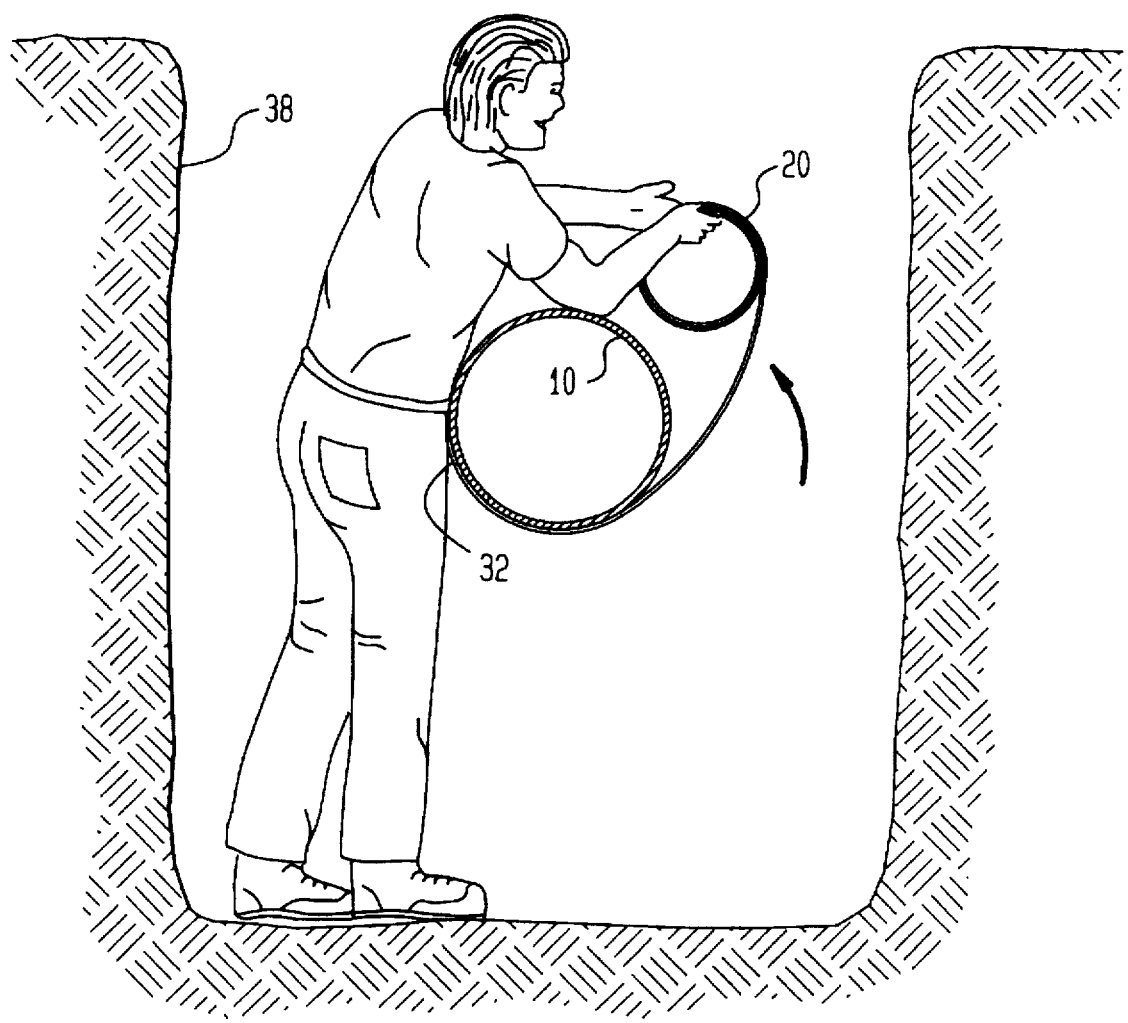
FIG. 8 is a highly schematic side elevation of a reinforcement band being installed around a pipeline in a ditch.

FIG. 8 shows a reinforcement band 20 being installed on a pipe 10 which is a part of a pipeline. The soil surrounding the portions of the pipeline which require reinforcement has been excavated to form a ditch 38 which is large enough so that there is sufficient clearance to maneuver the reinforcement band 20 around the pipeline. No cranes or other equipment are required to move the reinforcement bands 20 to the pipeline or to support the bands during installation. Due to their light weight, the reinforcement bands 20 can be carried and positioned manually, usually by one person. For example, the weight of a reinforcement band 20 for a 16 inch diameter pipe is about 14 pounds, and for a 30 inch diameter pipe, the weight is about 29 pounds.

Figure 5:
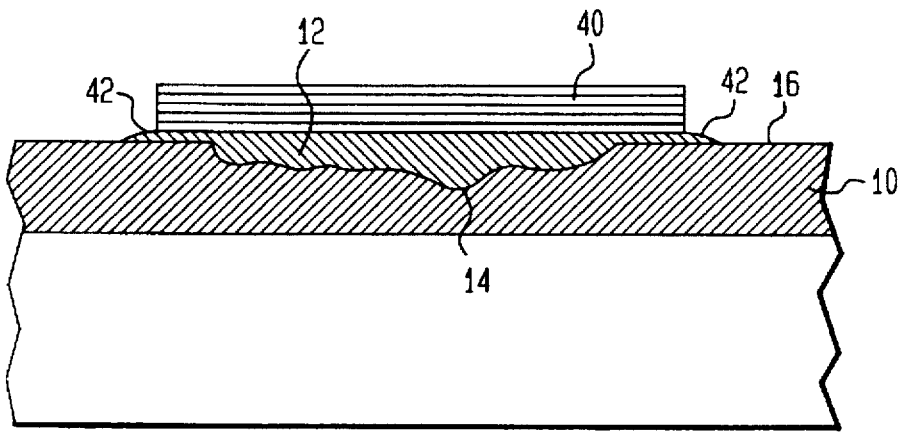
Figure 12:
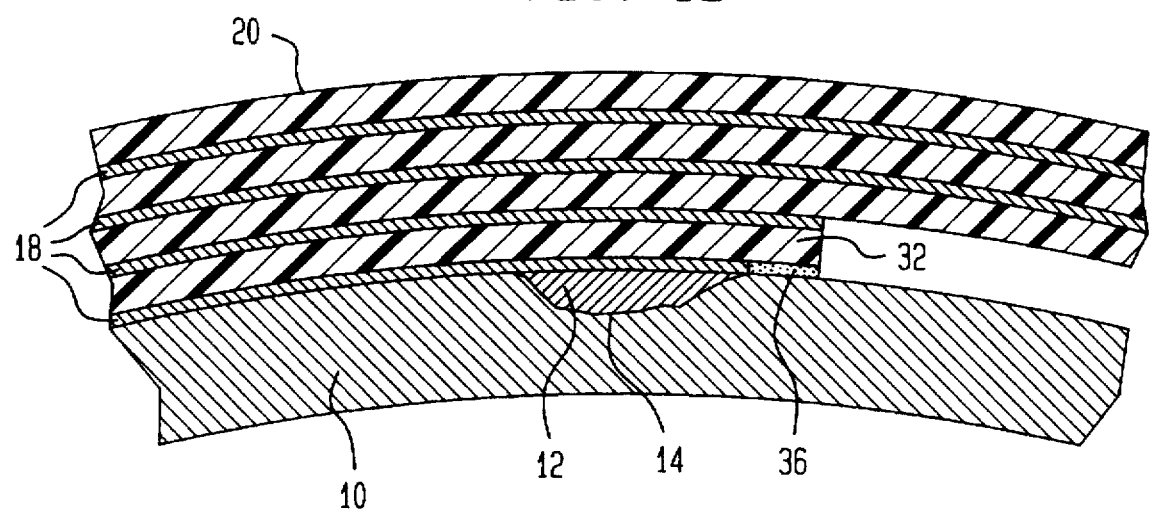
FIG. 12 is an enlarged fragment of the cross-sectional view of FIG. 11.

The reinforcement band 20 is initially applied to pipe 10 by adhering outer end 32 to adhesive pad 36 adjacent cavity 14. This is shown clearly in FIG. 12. With outer end 32 held in place, the reinforcement band 20 may be installed by moving the band under and then over the pipe 10, uncoiling the spiral as it is moved around the pipe. After the first convolution has been applied to the pipe 10, the outer surface of the convolution is coated with adhesive 18 and the reinforcement band 20 is again passed under and then over pipe 10 to form the next convolution. Again, the outer surface of this convolution is coated with adhesive 18 and the next convolution is formed, the process continuing until, as shown in FIG. 5, the entirety of reinforcement band 20 has been applied to pipe 10 to form a coil 40 thereabout, wherein the inner end 30 of the band 20 is brought into contact with the underlying convolution of the coil 40. Coil 40 will preferably include at least 5 convolutions, and more preferably about 8 convolutions, of reinforcement band 20.

Although FIG. 8 shows the reinforcement band 20 being installed by a single person, a two-person team is preferred since each person can pass the band over or under the pipe 10 to the other person during installation. In addition, one person can hold the remaining portion of band 20 and maintain tension in the convolution being applied to the pipe 10 to assure a tight fit, while the other person applies the coating of adhesive 18 to the external surface of the convolution.

As the convolutions of reinforcement band 20 are wrapped around pipe 10, the elasticity of the composite web will cause the convolutions to tighten somewhat upon themselves and upon the outer surface of pipe 10, thereby causing a portion 42 of filler material 12 to squeeze outwardly from beneath the side edges of coil 40. Desirably, once the entirety of reinforcement band 20 has been installed, the convolutions are radially aligned with one another by tapping on the side edges with a block or the like until the edges on each side of coil 40 are in substantial alignment with one another. The convolutions of coil 40 may then be tightened further by mechanical means until the innermost convolution of coil 40 is in intimate contact with outer surface 16 of pipe 10.

Figure 6:
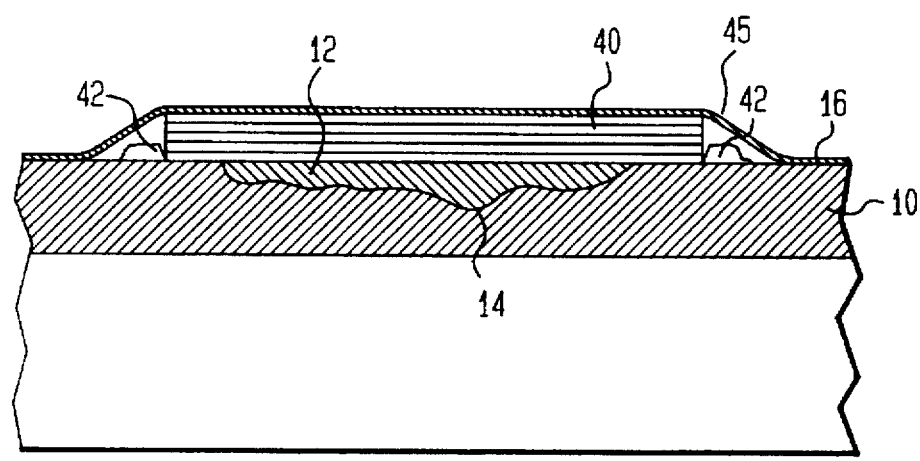

In one method for performing this tightening procedure, a Velcro pad is secured to the outermost convolution of coil 40 adjacent end 30. A cinch bar (not shown) can then be used to exert a tangential force on the outermost convolution of coil 40. The cinch bar consists of a rigid elongated bar having a strap attached at one end thereto. The free end of the strap is provided with a Velcro pad for mating with the Velcro pad adhered to the coil 40. When the two Velcro pads have been joined together, one end of the cinch bar is placed against the coil 40 and acts as a fulcrum for the application of a leverage force at the other end of the cinch bar. This leverage force pulls the cinch bar strap and the outer convolution of coil 40 attached thereto, thereby tightening each of the convolutions of coil 40 around pipe 10. The layer of adhesive 18 between adjacent convolutions, still in an uncured fluid state, acts as a lubricant to facilitate the tightening of the convolutions. As the convolutions of coil 40 are tightened, the innermost convolution comes closer and closer to the outer surface 16 of pipe 10 and additional amounts of filler material 12 are squeezed out from under the side edges of coil 40. The tightening process is completed when the innermost convolution of coil 40 is in intimate and substantially continuous contact with the outer surface 16 of pipe 10, as shown in FIG. 6. At this point, there are no void spaces between filler material 12 and the innermost convolution of coil 40. It is not necessary to coat the final convolution of coil 40 with adhesive. One or more strips of tape, for example, fiber tape, are placed around the coil 40 to hold the coil tightly in place until the adhesive 18 cures.

Optionally, a layer of a corrosion protection material 45 can be applied over the coil 40, encapsulating the coil and the adjacent portion of pipe 10. Corrosion protection material 45 may be a conventional shrink wrap, tape, mastic, wax or similar material which will serve as a moisture barrier to prevent further corrosion of pipe 10 in the repaired area.

Once the adhesive 18 has developed sufficient adhesive strength, which need not be its fully cured state, the pressure within the pipeline can be returned to normal operating pressures. During the curing of the adhesive 18, the filler material 12 is also curing so that, by the time the pressure in pipe 10 is increased, the filler material will have achieved a rigid state having sufficient compressive strength to transfer the load from pipe 10 to coil 40.

Figure 9:
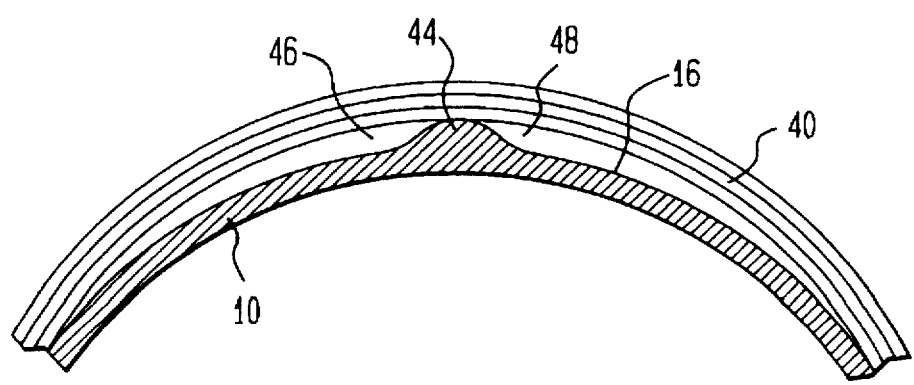
FIG. 9 is an enlarged, highly schematic, partial cross-sectional view of a reinforcement band installed around a pipe having a raised weld bead.

Referring to FIG. 9, pipe 10 may include a longitudinal weld bead 44 at the seam where the edges of the sheet of steel have been joined together to fabricate the pipe. Typically, this weld is formed by double submerge arc welding, and results in a weld bead 44 which is raised above the surface 16 of pipe 10. As a reinforcement band 20 is installed over a pipe having a raised surface irregularity, such as weld bead 44, void spaces 46 and 48 will be created between the outer surface 16 of the pipe and the reinforcement band. Desirably, before the reinforcement band 20 is applied to the pipe 10, filler material 12 is applied to the outer surface 16 of the pipe on either side of the raised weld bead 44 or similar raised surface irregularity so that, as the reinforcement band 20 is installed to form a coil 40 about the pipe, these void spaces 46 and 48 will be filled with filler material. As coil 40 is tightened, the filler material will spread throughout and entirely fill the void spaces 46 and 48.

Figure 10:
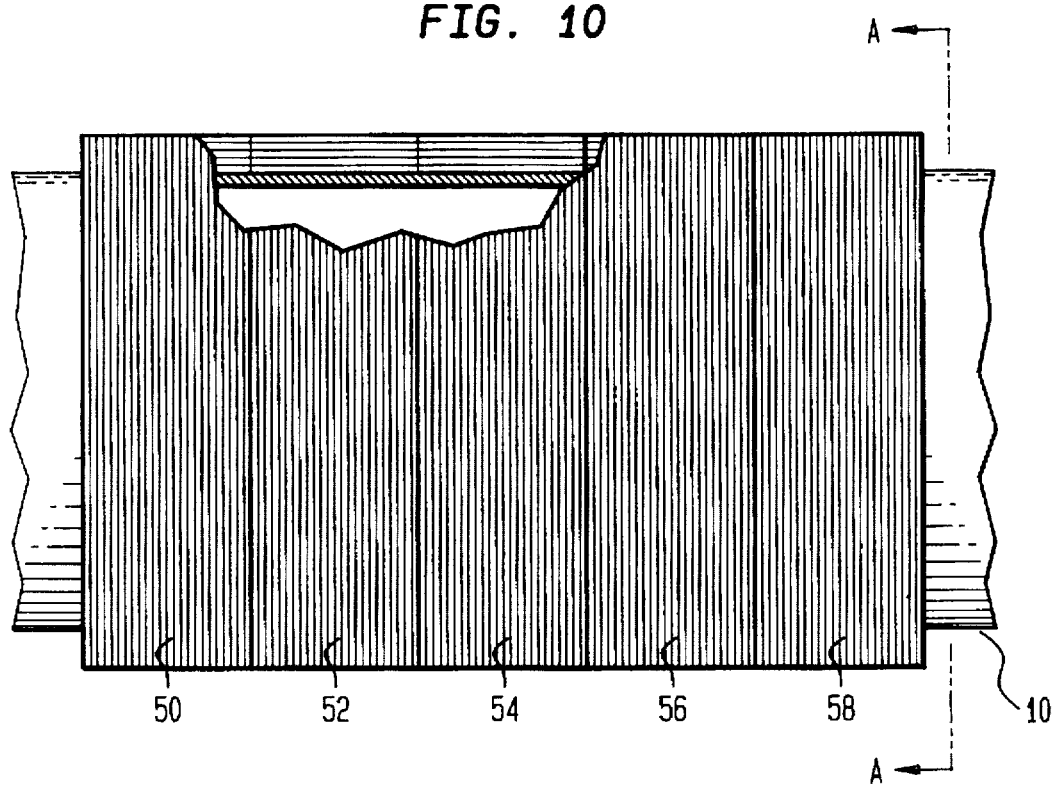
FIG. 10 is a fragmentary front view of a pipe on which a plurality of reinforcement bands according to the present invention have been installed to provide reinforcement, portions of some of the bands being cut away.
Figure 11:
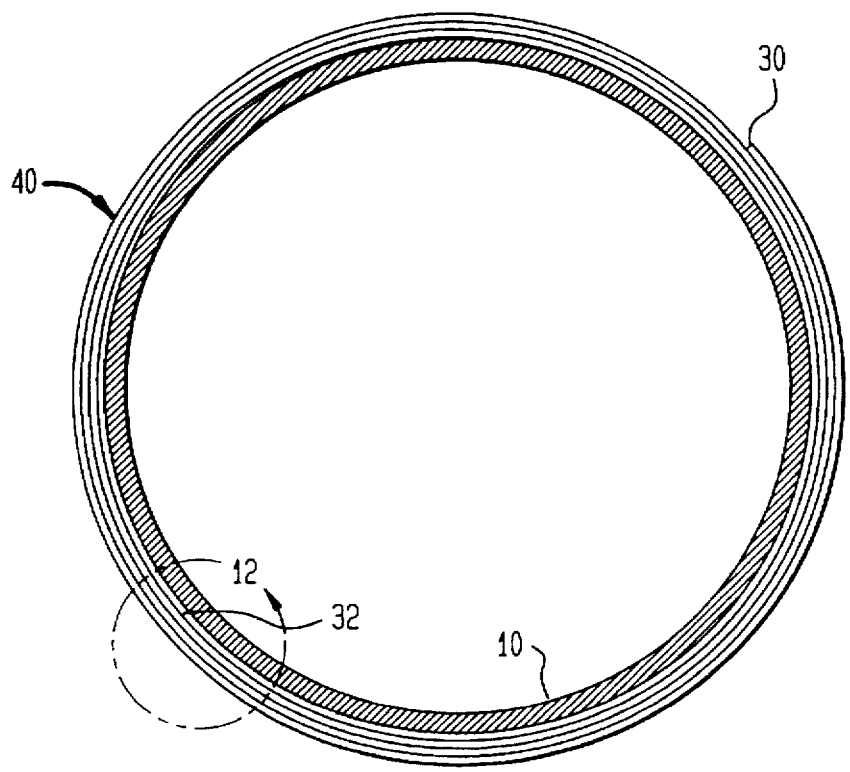
FIG. 11 is a transverse cross-sectional view taken along line A—A of FIG. 10.

The width of reinforcement band 20 will normally be selected so that it forms a coil 40 which is about two inches wider than cavity 14 so as to completely cover cavity 14; reinforcement bands having a width of about 10–12 inches are typical. However, providing a single reinforcement band may not be practical for defects which are relatively wide where an appropriately sized reinforcement band would be difficult to handle and maneuver for installation. In such event, a number of reinforcement bands 20 may be installed on the pipe to form a plurality of coils 50, 52, 54, 56 and 58 which entirely cover the defective region, as shown in FIG. 10. Each of coils 50–58 are formed as described in connection with the formation of coil 40. Although coils 50–58 are shown as abutting one another in edge-to-edge fashion, it is not essential that the coils be in actual contact. Rather, the pipeline will be adequately reinforced even with coils 50–58 installed with small gaps therebetween.

By practicing the foregoing methods for reinforcing a deteriorated portion of a pipeline, these pipelines have consistently and reliably been restored to at least their original burst strength. While not wishing to be held to any particular theory, it is believed that the inconsistent results achieved with the prior art technique for installing high tensile strength reinforcement bands to a deteriorated portion of pipeline do not relate to the high tensile strength material itself, but rather relate to the installation method and the relationship between the mechanism by which pipes burst and the mechanism by which the internal fluid pressure within the pipeline is transferred to the reinforcement band. During the transmission of gases and liquids through a pipeline, the pressure of these fluids generates a substantial hoop stress which causes a small amount of elastic expansion in the diameter of the pipeline. When new, the pipe has sufficient burst strength to sustain this hoop stress. However, as it corrodes, the burst strength of the pipe will diminish until it reaches a level at which is can no longer sustain the hoop stress generated under normal operating pressures. The exertion of further internal pressure will initially cause the pipe to deform plastically by bulging, and will eventually result in the pipe rupturing.

In techniques for reinforcing defective regions of the pipeline, the reinforcement is intended to assume part or all of the hoop stress normally sustained by the pipe. That is, as the pipe expands under the internal fluid pressure, this load will be transferred to the reinforcement which, since it has a relatively low modulus of elasticity, will not expand and will thus prevent the pipe from expanding further.

In the reinforcement techniques of the prior art employing bands of high tensile strength materials, the filler material is cured to a rigid state and ground down substantially flush with the outer surface of the pipe before applying the reinforcement band. Again, while not wishing to be held to any particular theory, it is believed that the inconsistent results achieved with this reinforcement method can be attributed to this filler material application and grinding step. That is, in attempting to grind the filler material smoothly, the unskilled workers rehabilitating the pipeline would sometimes grind away a small excess of filler material, resulting in the formation of one or more gaps 13 between the filler material and the reinforcement band, as can be seen in FIG. 1A. Alternatively, too little filler material may be ground away, resulting in the formation of gaps 15 between the filler material and the reinforcement band, as shown in FIG. 1B. In either case, when the fluid pressure within pipe 10 is increased to normal operating pressures, the pipe 10 will be able to expand through the volume of gap 13 on the one hand and gaps 15 on the other hand until contacting and being restrained by the reinforcement band 11. This small amount of expansion of pipe 10 may be sufficient for pipe 10 to fail by bursting.

By practicing the methods of the present invention in which the reinforcement band 20 is installed around pipeline 10 while the filler material 12 is still in an uncured, workable state, an intimate and substantially continuous contact is created between the outer surface of both the pipe 10 and the filler material 12 and the inner surface of the coil 40. As a result of this intimate and substantially continuous contact, as the pressure in pipe 10 is increased to normal operating pressures, the outward force exerted on the pipe by this fluid pressure will be transferred almost instantaneously to the coil 40. However, because of the high tensile strength and low elasticity of the composite material from which coil 40 is formed, the coil will not expand and will thus prevent any expansion from taking place in the pipe 10. Removing the ability of pipe 10 to expand essentially prevents the pipe from bursting at these normal pipeline operating pressures.

Figure 13:
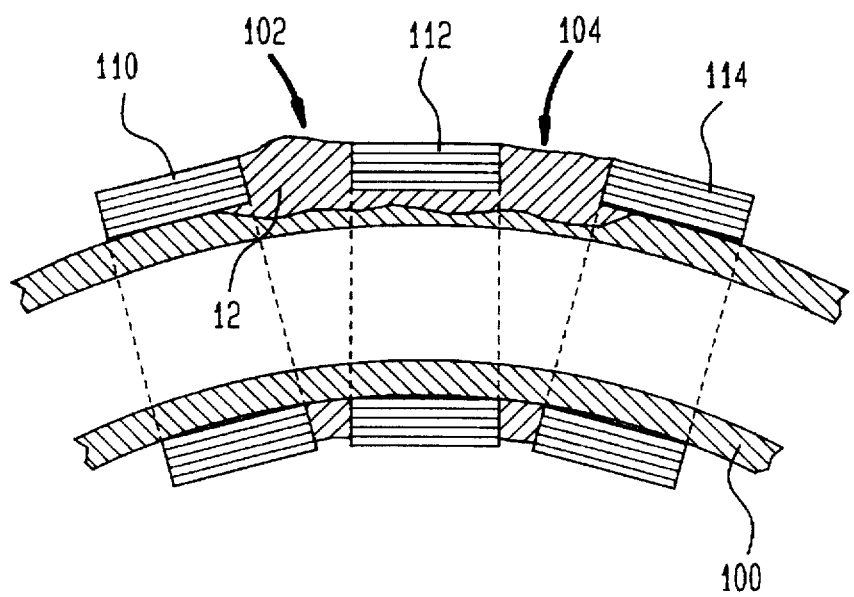
FIG. 13 is a front view of a bent pipe on which a plurality of reinforcement bands according to the present invention have been placed to provide reinforcement.

Many pipelines include relatively sharp bends for directing the pipelines around natural and man-made obstacles. In one variant of the present invention, the method described above for reinforcing a pipeline can be applied to repair and reinforce pipelines having gouges, dents or corrosion pitting along these bends. It will be appreciated that the radius of curvature of the pipeline will prevent a plurality of coils from being installed in edge-to-edge contact with one another in these curved regions. Thus, as shown in FIG. 13, the radius of curvature of the curved region 100 of the pipeline is such that significant gaps 102 and 104 will be extant on the outer radius of curvature of the pipeline between coils 110, 112 and 114, respectively. Gaps 102 and 104 will be present even in those cases where the edges of coils 110, 112 and 114 contact one another along the inner radius of curvature of the pipeline. The size of these gaps 102 and 104 can be minimized by making the width of coils 110, 112 and 114 as small as practical without detrimentally affecting the installation and function of the reinforcement. Thus, the optimum width of the coils will depend on the diameter of the pipeline and the radius of curvature of the bend. For example, for 12–18 inch pipelines having bends of about 90°, coils formed from reinforcement bands about 3–6 inches wide are preferred.

It has been found that the installation of coils 110, 112 and 114 in the same manner as described above in connection with coil 40 will result in a sufficient reinforcement of the pipeline in the curved region 100 to substantially restore the pipeline to its original burst strength. In that regard, while not wishing to be held to any particular theory, it is believed that the reinforcement benefit of each of coils 110, 112 and 114 does not end abruptly at the outer edges of the coils, but rather extends outwardly therefrom in gradually decreasing amounts. It is possible to take advantage of this "edge effect" by installing the coils 110, 112 and 114 as closely to one another as practical so that the diminishing reinforcement benefit from one coil will overlap and combine with the diminishing reinforcement benefit from an adjacent coil. The total of these edge effect benefits may provide sufficient reinforcement to return the pipeline to substantially its original burst strength. Optionally, the gaps 102 and 104 between the coils may be filled with a workable sealant or another workable material, such as filler material 12, in order to seal the edges of coils 110, 112 and 114 so that moisture cannot penetrate between the convolutions of the coils.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as defined by the appended claims. Moreover, it will be understood that it is intended that the present invention cover various combinations of the features described herein in addition to those specifically set forth in the appended claims.

We claim:

1. A method for repairing a pipe adapted to carry an internal load directed radially outward therefrom, said pipe having a defective region defined by at least one cavity extending from an outer surface of said pipe toward the center of said pipe but not extending completely through the wall of said pipe, said method comprising the steps of:

providing a filler material having a workable uncured state and a rigid cured state, filling said cavity to at least said outer surface of said pipe with said filler material in said workable state, providing at least one band having a plurality of elastic convolutions of high tensile strength material, while said filler material is in said workable state, wrapping said plurality of convolutions of said high tensile strength material about said pipe to form a coil overlying stud filler material, tightening said coil about said pipe so that said filler material completely fills that portion of said cavity underlying said coil, securing at least one of said convolutions to an adjacent one of said convolutions, and permitting said filler material to cure to said rigid state, whereby a load carried by said pipe is transferred substantially instantaneously from said pipe to said coil.

2. The method as claimed in claim 1, wherein said at least one cavity has a width extending axially with respect to said pipe, and said coil has a width which is greater than said width of said at least one cavity.

3. The method as claimed in claim 1, wherein said wrapping step includes the step of wrapping said plurality of convolutions of said high tensile strength material about said pipe to form a plurality of individual coils arranged adjacent one another and overlying said filler material, said plurality of coils having a combined width which is greater than said width of said at least one cavity.

4. The method as claimed in claim 1, further comprising the step of adjusting said convolutions so that said plurality of convolutions are in radial alignment with respect to one another.

5. The method as claimed in claim 1, wherein said high tensile strength material is nonmetallic.

6. The method as claimed in claim 5, wherein said nonmetallic material comprises glass fibers.

7. The method as claimed in claim 6, wherein said glass fibers comprise E-type glass fibers.

8. The method as claimed in claim 1, wherein said high tensile strength material is electrically non-conductive.

9. The method as claimed in claim 1, wherein said filler material in said rigid cured state has a compressive strength of at least about 9,000 psi.

10. The method as claimed in claim 1, wherein said securing step includes the step of applying a layer of an adhesive between adjacent ones of said plurality of convolutions.

11. The method as claimed in claim 1, further comprising the step of applying a layer of an adhesive between said outer surface of said pipe and a first convolution of said high tensile strength material, said adhesive being compatible with said filler material so that said adhesive does not prevent said filler material from curing to said rigid state.

12. The method as claimed in claim 11, wherein said securing step includes the step of applying a layer of said adhesive between adjacent ones of said plurality of convolutions.

13. The method as claimed in claim 11, wherein said pipe includes a coating of a protective material, and wherein said adhesive is compatible with said protective material so that said adhesive does not soften said protective material.

14. The method as claimed in claim 1, wherein said step of providing said at least one band includes the step of providing at least one band of composite material including a multiplicity of continuous, high tensile strength filaments encapsulated in a resin matrix and extending codirectionally with one another through said resin matrix.

15. The method as claimed in claim 14, wherein said multiplicity of filaments in said at least one band of composite material includes a multiplicity of individual filaments independent of one another.

16. The method as claimed in claim 14, wherein said multiplicity of filaments are nonmetallic.

17. The method as claimed in claim 16, wherein said nonmetallic filaments comprise glass fibers.

18. The method as claimed in claim 17, wherein said glass fibers comprise E-type glass fibers.

19. The method as claimed in claim 14, wherein said composite material is electrically non-conductive.

20. The method as claimed in claim 14, wherein said at least one band of composite material has a coiled configuration in a relaxed condition and said winding step includes the steps of deflecting portions of said band to an uncoiled configuration and maneuvering said portions of said band around said pipe, wherein said portions of said band will move toward said relaxed condition to tighten about said pipe.

21. The method as claimed in claim 14, wherein said securing step includes the step of applying a layer of an adhesive between adjacent ones of said plurality of convolutions.

22. The method as claimed in claim 21, wherein said adhesive has an uncured fluid state and a cured adhesive state, said adhesive application step being conducted in said uncured fluid state of said adhesive.

23. The method as claimed in claim 22, wherein said adhesive in said cured state has a shear strength of at least about 900 psi.

24. The method as claimed in claim 22, wherein said adhesive in said cured state has an elongation of about 30%.

25. The method as claimed in claim 14, further comprising the step of applying a layer of an adhesive between said outer surface of said pipe and a first convolution of said coil, said adhesive being compatible with said filler material so that said adhesive does not prevent said filler material from curing to said rigid state.

26. The method as claimed in claim 25, wherein said adhesive has an uncured fluid state and a cured adhesive state, said adhesive application step being conducted in said uncured fluid state of said adhesive, said adhesive being compatible with said filler material so that said adhesive does not prevent said filler material from curing to said rigid state and said filler material does not prevent said adhesive from curing to said adhesive state.

27. The method as claimed in claim 25, wherein said securing step includes the step of applying a layer of said adhesive between adjacent ones of said plurality of convolutions.

28. The method as claimed in claim 1, wherein said step of providing said filler material includes the step of mixing a base material with an activator capable of reacting with said base material to cure said filler material to said rigid state.

29. The method as claimed in claim 28, further comprising the step of applying a layer of an adhesive between said outer surface of said pipe and a first convolution of said coil, said adhesive being compatible with said filler material so that said adhesive does not prevent said filler material from curing to said rigid state.

30. The method as claimed in claim 1, wherein said at least one band defines a spiral terminating in an inner end and an outer end, and each convolution of said band has an inner surface and an outer surface in contact with corresponding surfaces of adjacent convolutions, said high tensile strength material comprising a plurality of continuous, high tensile strength filaments encapsulated in a resin matrix in a cured state and extending through said spiral parallel to the direction of spiral.

31. The method as claimed in claim 30, wherein said filaments are nonmetallic filaments.

32. The method as claimed in claim 31, wherein said nonmetallic filaments comprise glass fibers.

33. The method as claimed in claim 32, wherein said glass fibers comprise E-type glass fibers.

34. The method as claimed in claim 30, wherein said high tensile strength material is electrically non-conductive.

35. The method as claimed in claim 32, wherein the elasticity of said convolutions biases said band into said spiral with a force greater than the weight of said band, whereby said band remains in said spiral when suspended by said outer end of said spiral.

36. The method as claimed in claim 1, further characterized by the steps of selecting an adhesive which is compatible with said filler material so that said adhesive does not prevent said filler material from curing to said rigid state, and applying a layer of said adhesive between said outer surface of said pipe and a first convolution of said coil.

37. The method as claimed in claim 1, wherein said securing step includes the steps of selecting an adhesive having an uncured fluid state and a cured adhesive state, said adhesive being compatible with said filler material so that said filler material does not prevent said adhesive from curing to said adhesive state, and applying a layer of said adhesive between adjacent ones of said plurality of convolutions, said adhesive application step being conducted in said uncured fluid state of said adhesive.

38. A method for repairing a pipe having a raised region on an outer surface thereof and having a defective region defined by at least one cavity extending from said outer surface of said pipe toward the center of said pipe, said method comprising the steps of:

providing a filler material having a workable uncured state and a rigid cured state, filling said cavity to at least said outer surface of said pipe with said filler material in said workable state, applying said filler material in said workable state to said outer surface of said pipe adjacent said raised regions, providing at least one band having a plurality of elastic convolutions of a high tensile strength material, while said filler material is in said workable state, wrapping said plurality of convolutions of said high tensile strength material about said pipe to form a coil overlying said filler material, said step of forming said coil creating void spaces between said outer surface of said pipe and said coil, tightening said coil about said pipe so that filler material completely fills that portion of said cavity underlying said coil and said void spaces, securing at least one of said convolutions to an adjacent one of said convolutions, and permitting said filler material to cure to said rigid state.

39. A method for repairing a pipe having a defective region defined by at least one cavity extending from an outer surface of said pipe toward the center of said pipe, said defective region being in a portion of said pipe curved in the axial direction, said curved portion having an outer radius of curvature and an inner radius of curvature, said method comprising the steps of:

providing a filler material having a workable uncured state and a rigid cured state, filling said cavity to at least said outer surface of said pipe with said filler material in said workable state, providing at least one band having a plurality of elastic convolutions of a high tensile strength material, while said filler material is in said workable state, wrapping said plurality of convolutions of said high tensile strength material about said pipe to form a plurality of coils overlying said filler material so that adjacent ones of said coils are spaced from one another along said outer radius of curvature to define unwrapped regions, tightening said plurality of said coils about said pipe so that said filler material completely fills that portion of said cavity underlying said plurality of coils, securing at least one of said convolutions to an adjacent one of said convolutions in each of said plurality of coils, and permitting said filler material to cure said rigid state.

40. The method as claimed in claim 39, further comprising the step of filling said unwrapped regions between said plurality of coils with a workable material.

41. The method as claimed in claim 40, wherein said workable material comprises said filler material.

42. A method for repairing a pipe adapted to carry an internal load directed radially outward therefrom, said pipe having a defective region defined by at least one cavity extending from an outer surface of said pipe toward the center of said pipe but not extending completely through the wall of said pipe, said method comprising the steps of:

providing a filler material having a workable uncured state and a rigid cured state, filling said cavity to at least said outer surface of said pipe with said filler material in said workable state, providing an adhesive having an uncured fluid state and a cured adhesive state, while said filler material is in said workable state, applying a layer of said adhesive in said uncured fluid state over a circumferential portion of said pipe including said cavity, said adhesive being compatible with said filler material so that said adhesive does not prevent said filler material from curing to said rigid state, also while said filler material is in said workable state, wrapping a band of composite material about said pipe to form a coil overlying said filler material and said adhesive layer, said band defining a spiral terminating in an inner end and an outer end and having a plurality of elastic convolutions for encircling and engaging said pipe, each convolution having an inner surface and an outer surface bearing against corresponding surfaces of adjacent convolutions, said composite material comprising a plurality of continuous, high tensile strength filaments encapsulated in a resin matrix and extending through said spiral parallel to the direction of spiral, simultaneous with said wrapping step, applying a layer of said adhesive in said uncured fluid state between adjacent ones of said plurality of convolutions, tightening said coil about said pipe so that said filler material completely fills that portion of said cavity underlying said coil, and permitting said filler material to cure to said rigid state and said adhesive to cure to said adhesive state, whereby a load carried by said pipe is transferred substantially instantaneously from said pipe to said coil.

43. A method for repairing a pipe adapted to carry an internal load directed radially outward therefrom, said pipe having a defective region defined by at least one cavity extending from an outer surface of said pipe toward the center of said pipe but not extending completely through the wall of said pipe, said method comprising the steps of:

providing a filler material having a workable uncured state and a rigid cured state, filling said cavity to at least said outer surface of said pipe with said filler material in said workable state, providing at least one band having a plurality of elastic convolutions of a high tensile strength material, while said filler material is in said workable state, wrapping said plurality of convolutions of said high tensile strength material about said pipe to form a coil overlying said filler material, tightening said coil about said pipe so that said filler material substantially completely fills void spaces in a portion of said cavity underlying said coil and between said outer surface of said pipe and said coil, securing at least one of said convolutions to an adjacent one of said convolutions, and permitting said filler material to cure to said rigid state, whereby a load carried by said pipe is transferred substantially instantaneously from said pipe to said coil.

* * * * *

UNITED STATES PATENT AND TRADEMARK OFFICE
CERTIFICATE OF CORRECTION

PATENT NO. : 5,632,307
DATED : May 27, 1997
INVENTOR(S) : Fawley et al.

It is certified that error appears in the above-identified patent and that said Letters Patent is hereby corrected as shown below:

Column 7, line 20, "07/942,642" should read --07/942,624--.

Column 12, line 24, "stud" should read --said--.

Column 14, line 29, "32," should read --30,--.

Signed and Sealed this

Ninth Day of September, 1997

*Attest:*

BRUCE LEHMAN

*Attesting Officer*  *Commissioner of Patents and Trademarks*